United States Patent [19]

Henter, Jr.

[11] 4,236,726

[45] Dec. 2, 1980

[54] HYDRAULIC SUSPENSION SYSTEM FOR AN INDIVIDUAL VEHICLE WHEEL

[76] Inventor: Theodore C. Henter, Jr., 1372 - 49 Ave., NE., St. Petersburg, Fla. 33703

[21] Appl. No.: 2,047

[22] Filed: Jan. 8, 1979

Related U.S. Application Data

[63] Continuation-in-part of Ser. No. 823,057, Aug. 9, 1977, Pat. No. 4,133,555.

[51] Int. Cl.³ .............................................. B60G 11/26
[52] U.S. Cl. .................................... 280/709; 280/714
[58] Field of Search ............... 280/709, 702, 704, 708, 280/711, 714, 668, 276, 688, 689, 698; 267/11 A; 188/303, 312

[56] References Cited

U.S. PATENT DOCUMENTS

| | | | |
|---|---|---|---|
| 2,363,867 | 11/1944 | Isely | 188/312 |
| 2,771,968 | 11/1956 | Mercier | 188/312 |
| 3,156,481 | 11/1964 | Dangauthier | 280/668 |
| 3,328,019 | 6/1967 | Wilson | 267/11 A |
| 3,483,952 | 12/1969 | Cardwell | 188/312 |
| 3,854,710 | 12/1974 | Nicholls | 280/709 |

FOREIGN PATENT DOCUMENTS

| | | | |
|---|---|---|---|
| 752173 | 9/1933 | France | 267/11 A |
| 7724562 | 3/1979 | France | 188/312 |

*Primary Examiner*—John J. Love
*Assistant Examiner*—Ross Weaver
*Attorney, Agent, or Firm*—David H. Semmes; Warren E. Olsen

[57] ABSTRACT

An improved suspension system for a vehicle wheel, and particularly for single track vehicle wheels as found in motorcycles and the like. The invention comprises an improvement in a vehicle having a wheel mounted for rotation upon a transversely extending axle, whereby the axle will be maintained perpendicular to the longitudinal plane of rotation of the wheel, regardless of vertical axle movement with respect to the frame of the vehicle. In the preferred embodiment, the pressure fluid is hydraulic fluid and the wheel axis is solely connected to the vehicle frame through the fluid pressure interconnection defined by the present device. The present invention allows only vertical movement of the vehicle axis. If the wheel is being urged out of alignment, as by side stress, there is a counter flow of hydraulic fluid from one hydraulic-piston into the diametrically opposite hydraulic-piston chamber, thereby realigning the axle so that it remains perpendicular to the longitudinal plane of rotation of the wheel.

4 Claims, 5 Drawing Figures

HYDRAULIC SUSPENSION SYSTEM FOR AN INDIVIDUAL VEHICLE WHEEL

CROSS-REFERENCES TO RELATED APPLICATIONS

This application is a continuation-in-part of my earlier application entitled HYDRAULIC SUSPENSION SYSTEM FOR VEHICLE WHEELS, which was filed Aug. 9, 1977 as Ser. No. 823,057, and is now U.S. Pat. No. 4,133,555.

BACKGROUND OF THE INVENTION

1. Field of the Invention:

The present invention is an improvement in a suspension system, particularly a suspension system for an individual vehicle wheel, as found, for example, in single track vehicles such as motorcycles and the like. The present invention functions both as the interconnection or suspension system for such an individual vehicle wheel, and a self-aligning device whereby the wheel remains correctly oriented with respect to the frame of the vehicle.

2. Description of the Prior Art

Prior art suspension devices are noted in the copending parent application Ser. No. 823,057, and to my present knowledge the prior art is devoid of a suspension system which allows the individual wheel, of a motorcycle, for example, to be both suspended with respect to a vehicle frame, and also automatically realigned regardless of any side loadings on the wheel, relative to the frame of the vehicle. The present invention is an improvement upon devices characterized by having a transversely extending axle, wherein it is necessary to maintain this axle perpendicular to the longitudinal plane of rotation of the wheel, regardless of relative axle movement. The present invention allows the transverse axle to move, in order to absorb shock, but only so that the transverse axle always remains perpendicular to the longitudinal plane of rotation of the vehicle wheel. Known prior art vehicle stabilizing systems generally employ mechanical linkage or hydraulic systems for suspending a pair of automobile wheels, for example, wherein each of the two wheels is at opposite ends of a rigid axle assembly. In distinction, the present invention is concerned with orienting a single wheel of any vehicle, and particularly, a single track vehicle such as a motorcycle, whereby the device will independently align this single wheel and axle assembly, with respect to the vehicle frame. The present invention is not at all concerned with orienting the frame of the vehicle with respect to a ground reference point, for example; rather, the present invention has as its sole and particular utility the maintaining of the certain relationship between the plane of rotation of a wheel and the surrounding vehicle frame.

SUMMARY OF THE INVENTION

According to the present invention, there is taught a preferred embodiment wherein a motorcycle wheel is both suspended and maintained in alignment to its motorcycle frame, by a certain combination of structure. The preferred embodiment of the present invention includes a hydraulic fluid to supply a pressure medium from the upper chamber of a first piston cylinder arrangement to the lower chamber of a piston cylinder arrangement which is on the opposite side of the axle supporting the single vehicle wheel. Each of these cylinders is mounted parallel to the longitudinal plane of rotation of the wheel, and the wheel is mounted midway on the axle, between the two cylinder assemblies.

In each of these cylinder assemblies there is a double acting piston, and this piston is connected to the vehicle frame through a piston rod, which extends outwardly from the confines of the cylinder to a point of rigid attachment on the vehicle frame. Thus, the only mechanical support for the axle is through a hydraulic damping which is accomplished according to the present invention, by movement of a fluid in a cross-over relationship between pairs of hydraulic chambers on either side of the vehicle wheel. It is a primary object of the present invention to provide a simple and effective way of maintaining a suspension for a vehicle wheel, while also ensuring that any misalignment of the wheel, due to side stresses, for example, will be self corrected simultaneously with the shock absorbing function of the device. Further objects and features of the present invention will become more apparent from the following detailed description of the invention, wherein reference is made to the attached drawings.

DESCRIPTION OF THE PREFERRED EMBODIMENT

Figure 1:
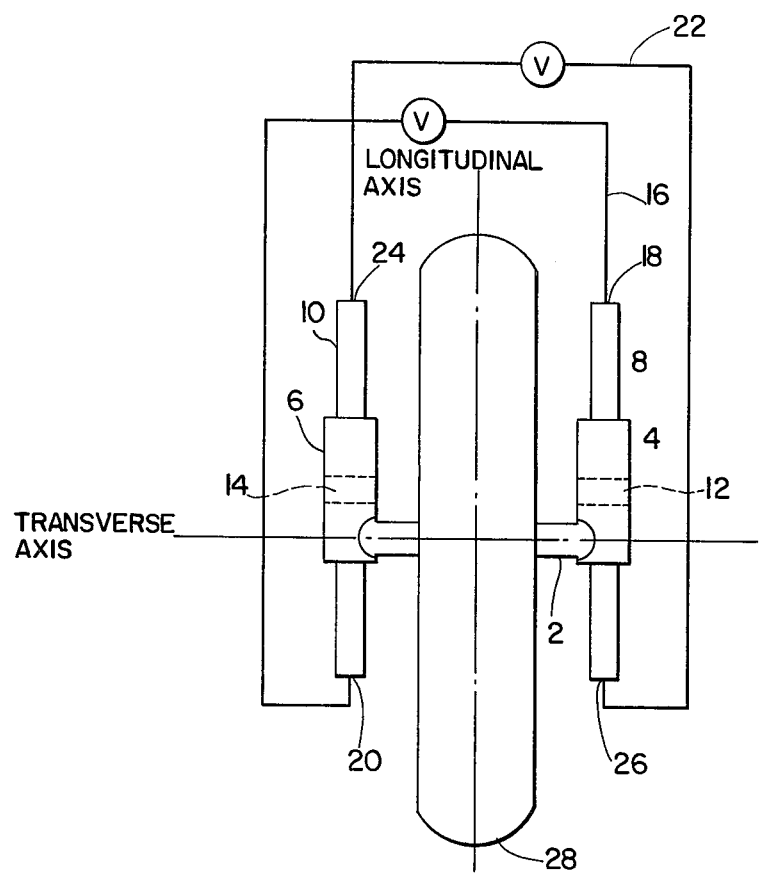
FIG. 1 is a schematic representation of the principles of the present invention, as applied to a motorcycle wheel axle.

In FIG. 1 there is shown a vehicle wheel, which is adapted for rotation upon a transversely extending axle, and it is desired that the axle be maintained perpendicular to a longitudinal plane of rotation of this wheel. In order to accomplish this desired goal, the present invention consists of a transversely extending axle, 2, and two cylinders, 4 and 6, which are fixed to a first and second end of the axle. The first cylinder, 4, extends vertically and parallel to a longitudinally extending plane, which is shown as a line denominated longitudinal axis in FIG. 1. There is a second cylinder, 6, which is affixed to the opposite end of the axle, 2, and oriented so as to also extend vertically and mutually parallel to both the longitudinal plane of rotation of the wheel, and the first cylinder. Each of these paired cylinders includes therewithin a double acting piston. The first cylinder, 4, includes a double acting piston, 12, and this piston is connected to the vehicle through a piston rod, 8. While no vehicle structure is shown in FIG. 1, it should be appreciated that the axle, 2, is connected to the vehicle frame through a fluid interconnection which is performed by this device. Hence, the present invention may comprise both the sole manner of suspending the axle from the vehicle frame, and also a device which ensures that the wheel itself will be maintained in a perfect alignment with the frame of the vehicle, despite any axle movement with respect to the frame of the vehicle.

In the preferred embodiment schematically illustrated in FIG. 1, the first cylinder unit, 4, includes a double acting piston, 12, with a piston rod, 8, which extends both upwardly and downwardly out of the cylinder unit. The piston rod includes an upper distal end, 18, which is both connected to one part of the frame of the vehicle, and also includes a point of attachment for a first hydraulic fluid line, 16. This first hydraulic fluid line fluidly interconnects the upper side of the cylinder-piston unit, 4, with the lower side of the cylinder-piston unit, 6, at the opposite side of the motorcycle wheel. In like fashion, the second cylinder, 6, includes double acting piston, 14, with a piston rod which also extends both upwardly and downwardly therefrom, wherein the second piston rod, 10, includes an upper distal end, 24, which both provides a point of attachment to one portion of the frame of the vehicle, and also a point for running a second hydraulic line, 22, to the lower distal end, 26, of the first cylinder-piston unit. Since, for example, the upper distal end of the first piston-cylinder unit, 18, is affixed with respect to the frame of the vehicle, the first hydraulic line, 16, can be conveniently routed without worry for movement with respect to the vehicle frame. The piston rods are hollow, as shown in FIG. 1, to allow the fluid communication for that diametrical cross-over relationship which is indicated. It can now be appreciated that as the axle, 2, is moved relative to the two piston rods, there will be a self-correcting fluid transfer among the four discrete pressure chambers, so that the axle, 2, will always be maintained perpendicular to a longitudinal plane of said vehicle, wherein that longitudinal plane of said vehicle is also definable as parallel to the respective piston rods, 8 and 10.

The operation of the present invention is analogous to that taught in my parent application Ser. No. 823,057, in that both the present invention and the parent application teach a method for maintaining a single track vehicle in an alignment, with respect to its surrounding vehicle frame. The present invention teaches further improvemwent on this concept through the provision of a single cylinder, which includes therewithin a single double acting piston, at either end of the axle supporting the wheel.

Figure 2:
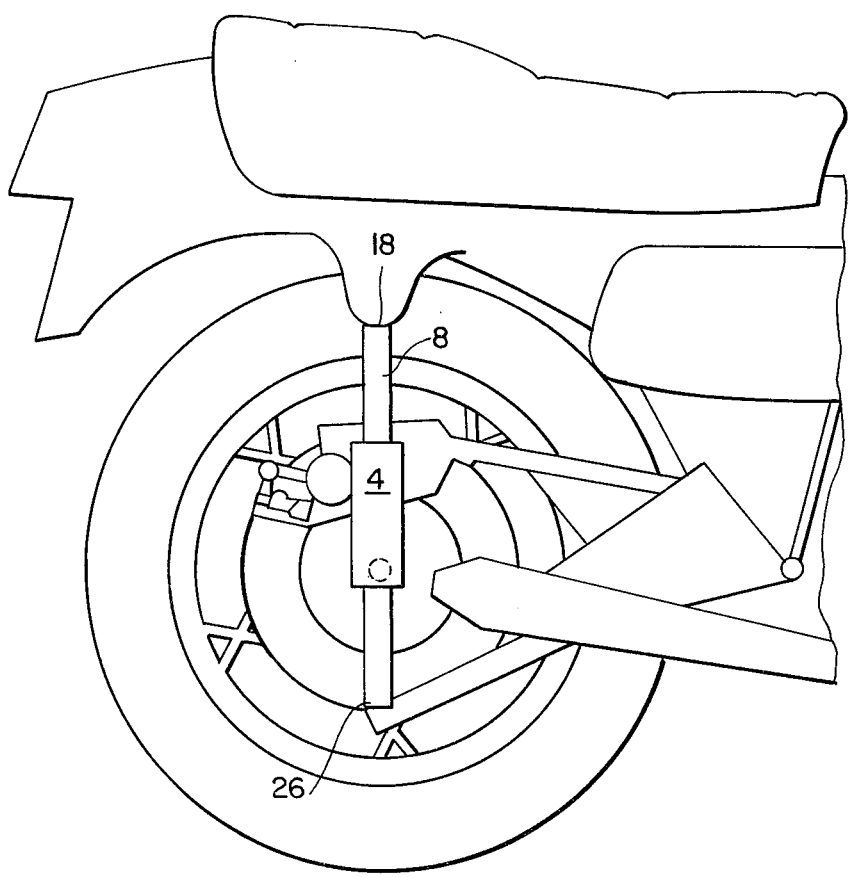
FIG. 2 is a schematic illustration of the application of the present invention to the frame of a motorcycle-type vehicle.

In FIG. 2 a preferred application of the present invention is shown in schematic relationship upon the rear structure of a conventional and known motorcycle design. As is clearly illustrated, the first cylinder is directly mounted to the rear axle of the motorcycle with the piston rod, 8, constituting the mechanical interconnection between the vehicle frame and the suspension cylinder, 4. In the application illustrated in FIG. 2, the piston rod, 8, includes both an upper distal end, 18, and a lower distal end, 26, with each of these ends being used to mechanically contact and secure the suspension assembly to the frame of the vehicle, as illustrated.

Figure 3:
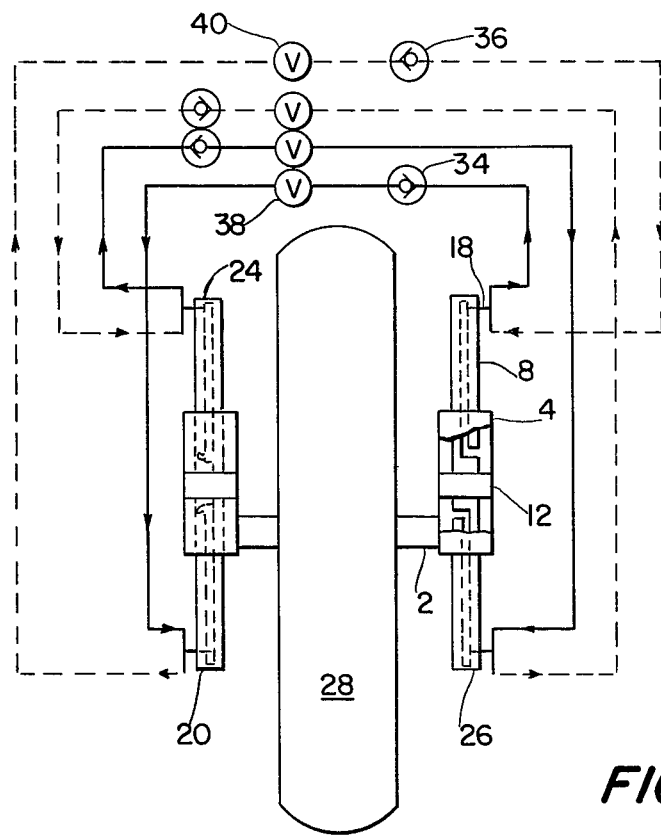
FIG. 3 is a further schematic view of one embodiment of the present invention, showing fluid flow directions.

FIG. 3 is a further schematic illustration of conventional valving and fluid lines which are usable with the present invention. In the embodiment of FIG. 3, there is again employed a hollow piston rod, 8, after the fashion shown in FIG. 1, with like numerals being used to show like elements. In FIG. 3, the vehicle wheel, 28, is supported upon a transverse axle, 2, and this axle, 2, is only mechanically interconnected to the vehicle frame by virtue of the hydraulic interface of the double acting piston, 12, within the cylinder, 4, with a likewise relationship being at the other side of the axle. FIG. 3 illustrates that the hydraulic lines between the diametrically opposed chambers of each cylinder-piston unit may be themselves interconnected with a pair of lines, having check valves or other sorts of control valves. For example, FIG. 3 illustrates by solid line, those transfer fluid lines which will carry fluid when the axle, 2, is moving downwardly, relative to a fixed position for the piston rods. The fluid above piston, 12, will then pass through the hollow piston rod, 8, and out into a hydraulic line which is attached proximate the upper distal end, 18. At that point, FIG. 3 illustrates that a check valve, 34, may be used in one line so as to limit the fluid flow towards and into the lower chamber which is diametrically opposite. In FIG. 3 a solid line shows fluid transfer direction when the axle is moving relatively downward relative to the frame of the vehicle, and the dotted lines show the transfer of fluid in each direction when the wheel is being moved in the opposite direction. As shown in FIG. 3 there can also be a needle valve, 38, in combination with a check valve, 34, for example, in order to selectively limit fluid flow in one direction, with a second needle valve, 40, and a second check valve, 36, to be the limiting factor for fluid flow in the opposite sense.

Figure 4:
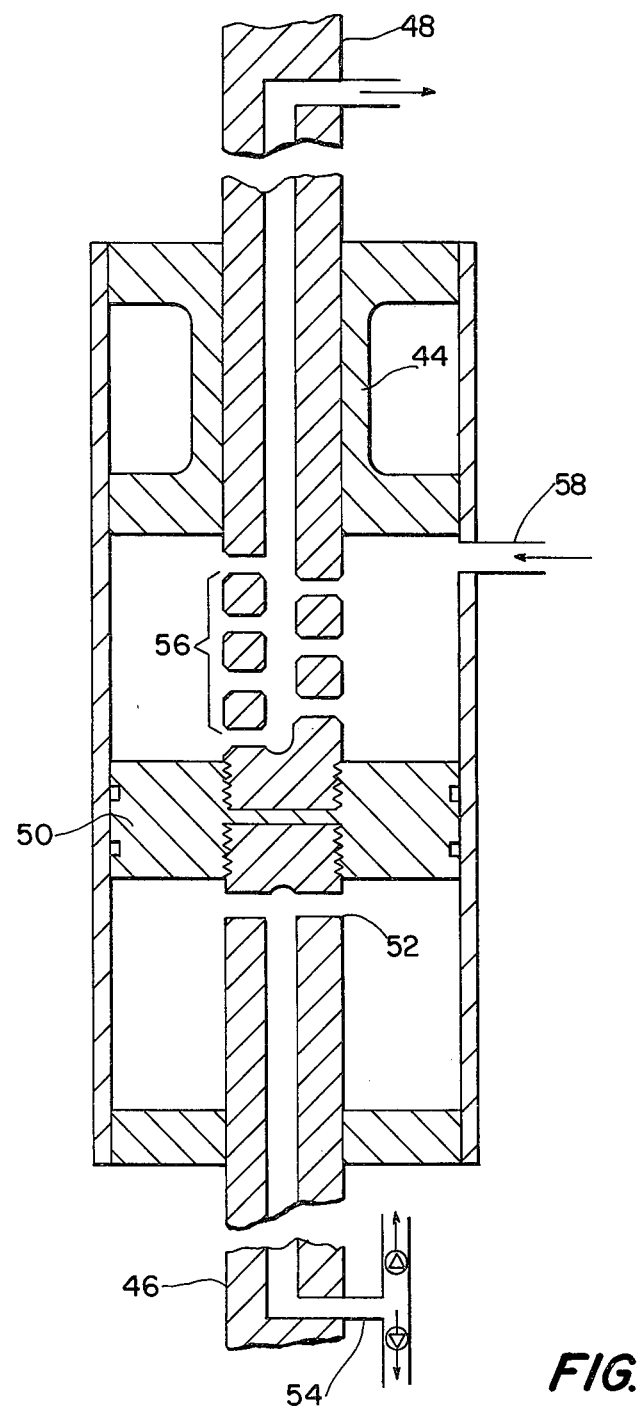
FIG. 4 is a cross-sectional view of a second embodiment of a double acting piston which is usable within the present invention.

FIG. 4 illustrates further a manner of having variable damping from one particular chamber of one cylinder-piston unit, after a fashion which is known in variable rate shock absorbers, for example. In FIG. 4 there is illustrated a plurality of orifices, 56, and a sleeve, 44, which is applicable to selectively cut off flow out of these orifices, depending on the position of the rod with respect to the sleeve, 44. This sleeve valve function can also be modified by an optional fluid port, 58, which is directly through the cylinder wall. With a cylinder-piston unit as shown in FIG. 4, the double acting piston, 50, has the variable area orifice, 56, above, and a single sized orifice, 52, below. Also in FIG. 4 the fluid interconnections are made through hollow extensions of a single piston rod, wherein the upper distal end, 48, is the mechanical interconnection to the vehicle frame, while a lower distal end, 46, is a second mechanical interconnection to the vehicle frame. Also as shown in FIG. 4 there can be selective paths, from the T-connection, 54, for further selective control of the fluid flow downstream of the point indicated. As is well known in the variable damping rate shock absorber art, for example, the number of fluid communication orifices, 56, is valved by the sleeve, 44. The orifices, 56, can therefore, become a limiting condition for fluid flow out of an upper chamber, and into the lower diametrically opposite chamber of the opposite cylinder-piston unit that is connected to a vehicle as shown in FIG. 1, for example. The FIG. 4 modifications are noted to illustrate that a selective control of the net damping rate of the present device can be accomplished by using known sleeve-valve technique, in the sense that it is known that fluid passage can be limited by a valve at any point in a line, i.e., the valving restriction can be anywhere in a line and effectively throttle the flow rate.

Figure 5:
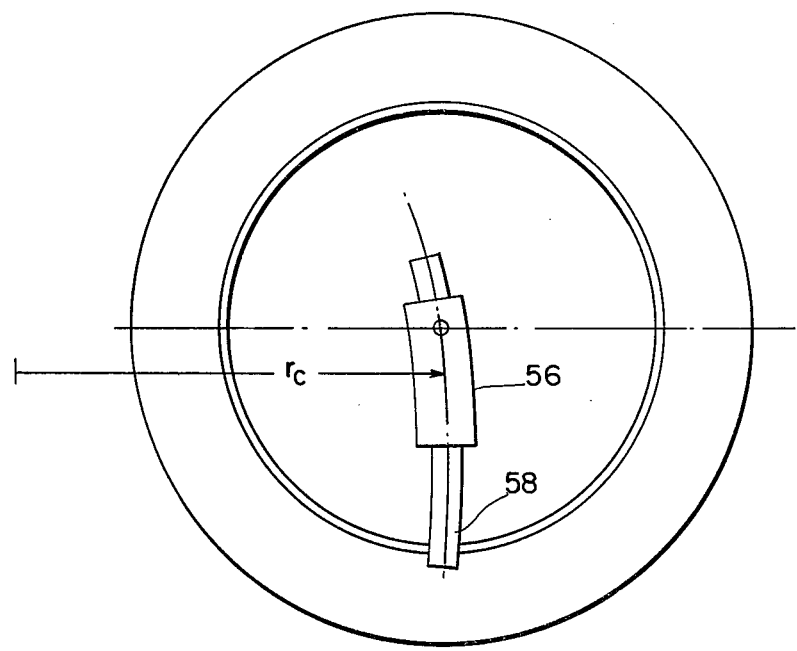
FIG. 5 shows a third embodiment of the present invention, employing a relatively curved cylinder and piston assembly.

FIG. 5 is an illustration of a further variation of the concepts of the present invention, wherein each of the pair of cylinder-piston assemblies includes a certain curvature. As shown in FIG. 5, there is a radius of curvature $R_c$, though the cylinder, 56, together with its piston, 58, are still parallel to the plane of the drawing of FIG. 5.

In other words, FIG. 5 illustrates that there can be a relative curvature of the cylinder-piston unit, provided that this curvature does not effect the mutual parallel relationship between each of the opposed cylinder-piston units, and the longitudinal plane of rotation of the intermediate vehicle wheel, as that term has been defined according to the present application. The present invention merely requires that the piston rods be parallel one to the other, and that an axle which supports a wheel be attached to each of the cylinders making up the assembly. It is apparent that, according to this invention, the axle will not be able to skew itself with respect to the frame of the wheel, but will only be allowed to translate in a path which is also parallel to the piston rods. Accordingly, the wheel rotating around said axle with itself then only move in one dimension; it will move in a path parallel to the piston rods and will not rotate or tilt about the longitudinal axis as illustrated and defined in FIG. 1.

FIG. 5 illustrates that the piston rods and the cylinders themselves may be curved along a radius, and this radius may be of any value from zero to infinity. Such a curvature, for example with respect to a conventional motorcycle, would ensure that the cylinders will follow an arc as they move relative to the piston rods. It is imagined that a radius of curvature of approximately seventeen inches will allow a constant chain tension as the rear wheel follows this arc, in view of conventional dimensions found in most motorcycles presently available.

In the preferred embodiments of the present invention, the axle of the individual wheel is interconnected with the frame of the vehicle only through a hydraulic means. Nonetheless, it is also possible that a further spring can be added so as to add additional support, or cushioning. For example, a coil spring could be easily wrapped around each of the cylinders as taught herein, such that movement of the cylinder and wheel in one direction will be further resisted by the spring. Accordingly, while the present invention itself requires no further support, it may be further modified by adding a surrounding spring, or some other secondary sort of interconnection between the frame and the vehicle axle, if desired. In either case, the present invention provides an absolute limiting technique for controlling axle movement with respect to the longitudinal plane of a vehicle, and any additional spring-type members would necessarily be subservient to the primary functioning of the instant suspension and wheel aligning device.

While preferred embodiments of my invention have been shown and described, it is understood that the scope of the present invention is to be defined by the scope of the appended claims.

I claim:

1. In a vehicle having a wheel mounted for rotation upon a transversely extending axle, the improvement of a suspension system between said wheel and a frame which is operable to maintain said axle perpendicular to the longitudinal plane of rotation for said wheel, regardless of axle movement with respect to said frame, wherein said improvement comprises:

(A) a first cylinder affixed to first end of said axle, a second cylinder affixed to the second end of said axle, wherein said wheel is mounted between said first and second ends and each of said cylinders extend vertically and are mutually parallel to themselves and said longitudinally extending plane;

(B) wherein each of said cylinders includes therewith a double acting piston, and each piston is interconnected to said vehicle frame through a piston rod, wherein there is defined an upper and a lower pressure chamber within each cylinder each of said piston rods extend both upwardly and downwardly outside of each of said cylinders, and the distal ends of each piston rod are respectively connected to said vehicle frame; and (C) cross-over means supply a pressure medium from the upper side of one cylinder-piston unit to the lower side of the cylinder-piston unit on the opposite side of said wheel, each of said piston rods including means for fluid communication to said crossover means, whereby vertical movement of said transverse axis is permitted, yet said axle is not permitted to become skewed with respect to said longitudinal plane of rotation for said wheel, since a vertical movement of the axle causes a pressure medium transfer from the upper of one cylinder, to the bottom of the cylinder at the opposite side of said axle, whereby the wheel is maintained in an alignment with respect to a longitudinal plane of said vehicle regardless of relative axle movement.

2. The improvement according to claim 1 wherein said vehicle is a motorcycle and like kinds of single-track vehicles, wherein the piston rod extending out of each cylinder includes an upper distal end which is connected to a first portion of the frame of said motorcycle, and a lower distal end which is connected to a second portion of the frame of said motorcycle, wherein further said pressure medium is hydraulic fluid and said piston rods are hollow, to allow said fluid communication between the upper side of a cylinder piston unit on one side of the motorcycle wheel and the lower side of the cylinder-piston unit on the opposite side of the motorcycle wheel.

3. The improvement according to claims 1, or 2 wherein said pressure medium is hydraulic oil, and said piston rod includes a plurality of orifices to allow fluid communication into at least one of the chambers defined within each of said cylinder units, wherein that chamber is closed off by a sleeve which is operable to cooperate with said plurality of orifices to provide a valving of fluid flow as a function of the number of orifices which remain exposed to that chamber.

4. The improvement according to claims 1, or 2 wherein each of said pair of cylinder-piston units has a centerline that is curved within a plane that is parallel to said longitudinal planes.

* * * * *